United States Patent
Xiong et al.

(10) Patent No.: US 9,448,857 B2
(45) Date of Patent: Sep. 20, 2016

(54) MEMORY ACCESS METHOD FOR PARALLEL COMPUTING

(75) Inventors: Yuqian Xiong, Fuzhou (CN); Zhi Lin, Fuzhou (CN)

(73) Assignee: FOXIT CORPORATION, Fuzhou, Fujian Province (CN)

( * ) Notice: Subject to any disclaimer, the term of this patent is extended or adjusted under 35 U.S.C. 154(b) by 349 days.

(21) Appl. No.: 13/638,974

(22) PCT Filed: Apr. 12, 2010

(86) PCT No.: PCT/CN2010/000481
§ 371 (c)(1),
(2), (4) Date: Nov. 16, 2012

(87) PCT Pub. No.: WO2011/123991
PCT Pub. Date: Oct. 13, 2011

(65) Prior Publication Data
US 2013/0061018 A1 Mar. 7, 2013

(30) Foreign Application Priority Data
Apr. 7, 2010 (CN) .......................... 2010 1 0140502

(51) Int. Cl.
*G06F 12/00* (2006.01)
*G06F 9/52* (2006.01)

(52) U.S. Cl.
CPC ....................... *G06F 9/52* (2013.01)

(58) Field of Classification Search
CPC .................... G06F 9/50; G06F 9/52
See application file for complete search history.

(56) References Cited

U.S. PATENT DOCUMENTS 7,234,144 B2 * 6/2007 Wilt ...................... G06F 9/3851
710/52

8,144,149 B2 * 3/2012 Jiao ........................ G06T 15/005
345/419
2002/0083252 A1 6/2002 Armstrong et al.
2011/0022817 A1 * 1/2011 Gaster ................... G06F 9/5044
711/202

FOREIGN PATENT DOCUMENTS

| CN | 100487660 C | 5/2009 |
| CN | 101477458 A | 7/2009 |
| CN | 101604263 A | 12/2009 |

OTHER PUBLICATIONS

International Search Report (in Chinese with English translation) for PCT/CN2010/000481, mailed Jan. 13, 2011; ISA/CN.

* cited by examiner

*Primary Examiner* — David X Yi
*Assistant Examiner* — Tahilba Puche
(74) *Attorney, Agent, or Firm* — Harness, Dickey & Pierce, PLC (57) ABSTRACT

A memory access method is disclosed for computing n parallel threads that invoke one original execution module. The method includes determining a number k (n−1≥k≥1) of k mirror execution modules to be created based on the number of n parallel threads. The method includes determining a mapping policy F between n threads and k+1 execution modules. The k+1 execution modules refer to the original execution module and the k mirror execution modules. The method includes creating the k mirror execution modules and allocating individual private memory to each of the k mirror execution modules. The method includes executing the n parallel threads and making each thread invoke the execution module according to the mapping policy F, with each execution module only accessing its private memory pool. The method includes, after the n parallel threads are finishing executing, deleting the k mirror execution modules and releasing the resources.

13 Claims, 7 Drawing Sheets

MEMORY ACCESS METHOD FOR PARALLEL COMPUTING

CROSS-REFERENCE TO RELATED APPLICATIONS

This application is a 371 U.S. National Stage of International Application No. PCT/CN2010/000481, filed on Apr. 12, 2010, which claims priority to Chinese Patent Application No. 201010140502.6, filed on Apr. 7, 2010. The contents of the above applications are incorporated herein by reference in their entirety.

TECHNICAL FIELD

The present invention relates to computer technology, particularly to memory access control in the multi-threaded PDF format file operations; and to a consequent memory access policy in the multi-threaded parallel computing, and to a method to improve the operational efficiency.

BACKGROUND ART

The digitalization of the physical resources such as books, pictures, documents and so on usually takes the forms of scanning, recognition and extraction. The documents are first scanned to PDF format, then the recognitions of the document modules and the text are carried out, and then the recognized information are extracted, so as to be filed and supplied to a search engine for indexing. In the prior art, it takes a lot of system resources, including CPU and memory resources, to operate on a large number of documents in PDF format, and the processing speed of the documents in PDF format is also slower. In order to improve the processing speed, various ways have been chosen, and especially in recent years, with the maturation of the technology of multicore processors, it has become one of the preferred ways to improve the computing speed to run multiple threads simultaneously on multiple CPUs.

However, in practical operation, the situation often occurs that the CPU can not be fully utilized, while the speed is limitedly increased. For example, if the CPU is fully utilized, a test opens four threads on the multicore machine, such as a 4-core CPU. When stress testing, each thread occupies one CPU. In theory, the CPU occupancy rate should be close to 100%. However, it is found in the practical test that the CPU occupancy rate is far less than 100%, and even in a lot of cases, the CPU occupancy rate is only 25%. This shows that not every CPU is at work, there should be some waiting threads. The CPU has not been fully utilized.

The inventors of the present invention carried out the analyses and researches on the causes of this phenomenon by combing their multi-year industry working experiences and experimental results, and eventually thought out that this situation occurred mainly in that in memory operational engineering, no matter whether the allocation or the release of the memory all required the thread protection and all threads shared one memory pool to access, which results in waiting for access, so that the CPU could not be fully utilized. And since the PDF operation is a very frequent operation on the memory, a large number of threads are caused to wait.

Concerning the memory access, in the memory management of a traditional operating system, each application usually is loaded into a separate process, and a private memory space is specified for each process, the memory space of one process can not communicate with that of another process. Generally speaking, one application process will create multiple entities, i.e., threads, when running, and the multiple threads belonging to one process share the resources of the process to access.

With the development of computing technology and hardware, especially in recent years, the extensive use of multicore processors, the concurrent execution of threads (parallel computing) becomes more and more common. When multiple threads are in parallel, taking the data security into account, the shared memory to access can be accessed one by one but can not be accessed simultaneously. Even though allowing for simultaneously accessing, there is frequently a situation that the allocated memory pool is not enough for the use of multiple threads, which results in waiting to access. Especially when multi-CPUs are used and each CPU run one thread, when the time required for CPU processing is less than the time for memory accessing and waiting, the memory accessing becomes the bottleneck of the computing speed, so that the CPU resources can not be fully utilized, and impeding the further increase of the computing speed is impeded.

Figure 1:
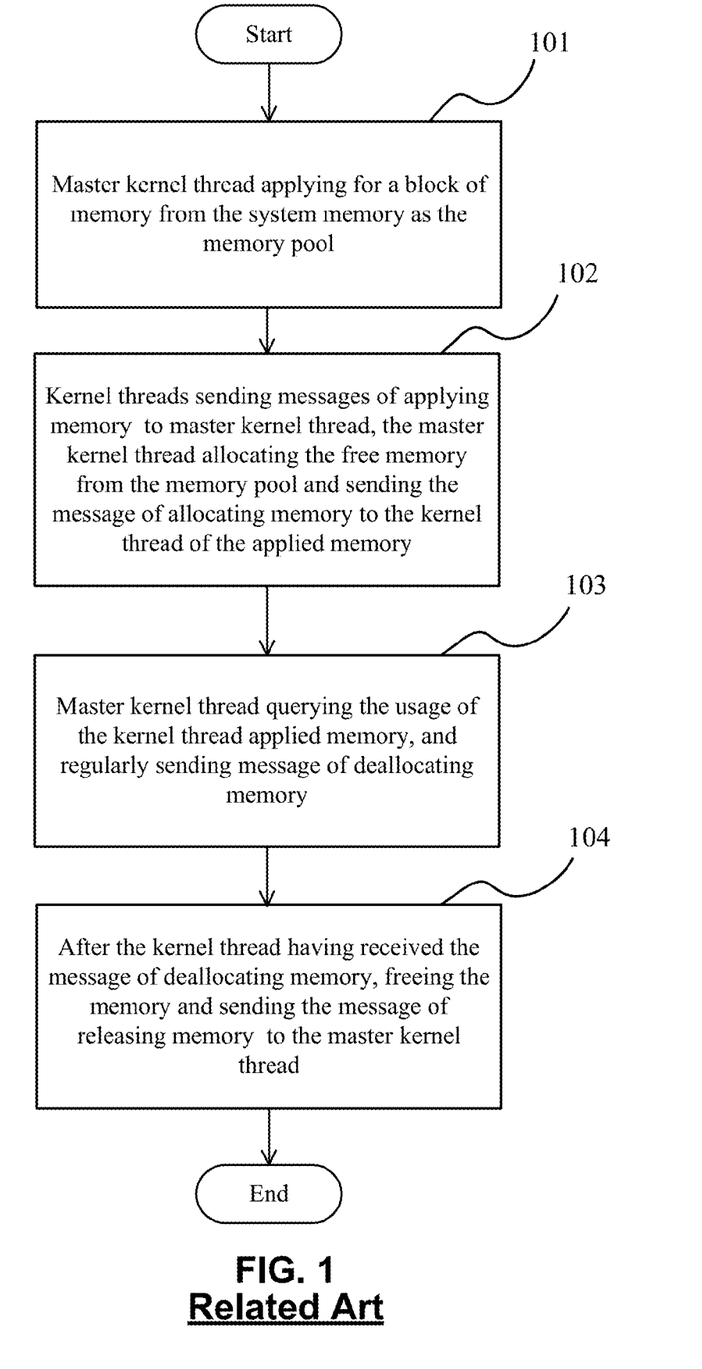
FIG. 1 is a flowchart of memory management method of the prior art.

In order to improve the memory access, the skilled in the art has proposed a variety of methods. For example, the Chinese Invention Patent which is entitled "a dynamic memory management system of a multi-threaded processor and a method thereof" and which has the grant publication No. CN 100487660C discloses a multi-threaded processor dynamic memory management method (see FIG. 1), the method comprising the steps of: Master kernel thread applying for a block of memory from the system memory as the memory pool (step 101); All kernel threads sending messages of applying memory to said master kernel thread, after the master kernel thread having received said message of applying memory, allocating the free memory from the memory pool to the kernel thread of the applied memory and sending the message of allocating memory to the kernel thread of the applied memory (step 102); Said master kernel thread querying the usage of the kernel thread applied memory, and regularly sending message of deallocating memory (step 103); After the kernel thread having received said memory message of deallocating memory, freeing the memory and sending the message of releasing memory to the master kernel thread (step 104).

To a certain extent, the method solves the problem of memory release of the kernel thread, and can avoid a certain free kernel thread taking up too much free memory at a certain moment. The hardware arbiter is replaced by the master kernel thread, and a message mechanism is used to improve the efficiency of allocating memory among various kernel threads. But this method can not solve the problem that the multiple threads which share a memory pool to access all request a larger memory space and must be queued up for. And it is necessary for this method to change the memory management codes. And thus this method is not suitable for directly transplanting the codes.

SUMMARY OF INVENTION

The object of the invention is that for the problem that when multiple threads invoke the same execution module, since the same memory pool must be shared to access and the memory pool can not provide sufficient resources, the time waiting to access memory is caused too long. A new memory access policy is provided to shorten or even eliminate the time waiting to access memory when parallel computing, so that one single thread can have a separate memory pool.

The more important object is to be able to simply transplant single-threaded codes to a multi-threaded environment in the case that the module codes are not changed or rarely changed, and especially memory management is not changed. And give full play to advantages of multicore and multithread.

A memory access method for parallel computing of the present invention is applied in the case that $n(n≥2)$ parallel threads invoke the same original execution module, characterized in that it comprises the steps of:

S1) Determining the number k of mirror execution modules needed to be created based on the number n of threads, wherein $n-1≥k≥1$;

S2) Determining the mapping policy F between the n threads and the execution modules including the original execution module as well as the k mirror execution modules;

S3) Creating k mirror execution modules, and allocating private memory pool to each of them respectively;

S4) Executing the n parallel threads, and making each thread invoke the execution module according to the mapping policy F, wherein each execution module access and only access its private memory pool;

S5) Deleting the created mirror execution modules after the thread operation is finished, and releasing the resources.

Wherein, the number k of the mirror execution modules may vary with time. Alternatively, the number k of the mirror execution modules can also be constant during executing the threads.

Preferably, the number of mirror execution modules can be determined according to a statistical value of the number of threads invoking the same execution module at the same time.

According to an embodiment of the present invention, the number k of the mirror execution modules is 1.

According to another embodiment of the present invention, the number k of the mirror execution modules is $n-1$.

Wherein, when the number k of the mirror execution modules is $n-1$, the mapping policy F may be: each thread invokes a different execution module, and the threads and the execution modules are in one-to-one correspondence.

According to yet another embodiment of the present invention, the mapping policy F can be a static policy, one thread only points to one execution module which is invoked by the thread, and one execution module is invoked by one or more threads.

Preferably, in the mapping policy F, each of the threads frequently invoking execution modules is configured to exclusively access one execution module, and the threads relatively less frequently invoking execution modules are configured to share to access one execution module.

According to yet another embodiment of the present invention, the mapping policy F is a "multi-window-queuing" mechanism of dynamic policy; in said dynamic policy, each execution module is defined as two states including "free" and "busy", all of the free execution modules are queued, the thread which is needed to invoke execution modules invokes one module selected from the queue of the free execution modules; if there are no free execution modules, the thread waits; the execution modules are labeled as busy during invoking the execution modules of the thread; after the execution is finished, the thread releases the execution modules, and the execution modules are labeled as free.

Application of the method of the invention can make the parallel computing efficiency increase linearly as the number of core increases, but not be limited by the memory access bottleneck. It can be applied to a variety of operating systems. And, using the static mode, even without the need to add the code, a single-threaded program can be transplanted directly to a multi-threaded environment. Flexible dynamic mode and dynamic mapping policy can increase the efficiency in a manner that gets twice the performances with half the efforts without the present invention occupying so many system resources.

DETAILED DESCRIPTION

An object of the present invention is to change the memory access manner on the premise that the operating system memory management doesn't change. To facilitate the better understanding of the invention, description is first made to the general memory management mode.

One of the characteristics of the memory management is the execution modules are isolated, each execution module is assigned a separate space of memory pool. Wherein, the execution module can be regarded as a data structure which is created by the system in the memory, for managing the program code, data and resources which are loaded into the memory upon the management operation. Each execution module as a system resource allocation unit exclusively accesses its own memory pool, multiple functions in the execution module share to access the memory pool of this execution module.

The execution module can be an executable program or a dynamic link library (dll) and so on in the windows which is loaded into a process after operation. No matter how many threads are being invoked, the same execution module will only be loaded once by all threads which are turned on by same process, and for the same execution module, its memory pool is shared to access. Depending on the difference between the types of operating systems, the execution modules may also have other forms. According to the known of the skilled in the art, the memory management modes of different operating systems will be different, but there all exists such a specific unit that it is made up of a collection of some data and codes and appears as the forms of program, function and so on, and the operating system will assign a private memory space (logical or physical) for this kind of codes combination for its access. Therefore, in the present invention, the execution module can also be interpreted in a given operating system as a collection of a set of codes and data which is assigned a separate memory pool based on the operating system's default memory management mode.

Figure 2:
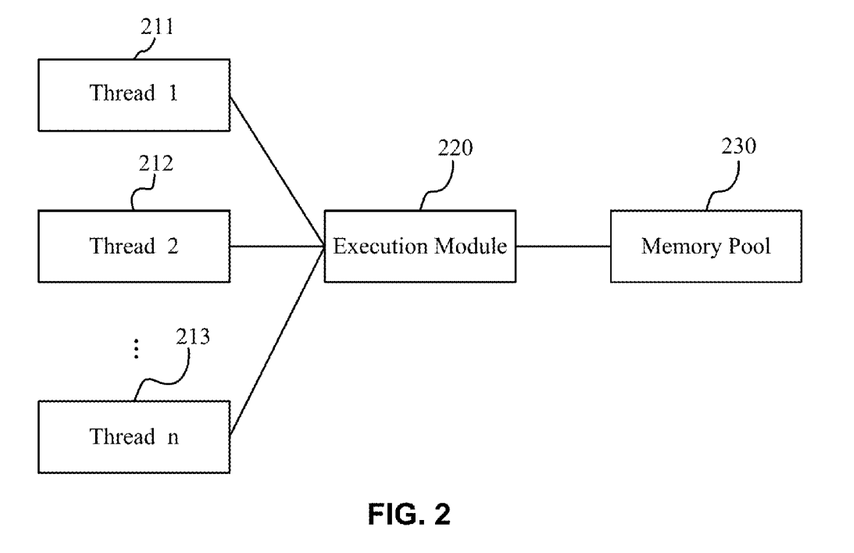
FIG. 2 is a schematic diagram of the memory access when multiple threads all invoke the same execution module.

FIG. 2 shows the memory access with multiple threads using the same execution module. Wherein, process 1 (211), process 2 (212) process n (213) and so on are multiple parallel threads of an application, they are required to invoke an execution module 220, and the execution module 220 accesses the memory pool 230.

In such a multi-threaded environment, when multiple threads (211-213) invoke an execution module (220) at the same time, if multiple threads in the execution module need to operating on memory (for example, applying and releasing) at the same time, i.e. operating on the same memory pool, the access of thread on memory need to be queued, thus the memory cause the thread to wait, resulting in that the CPU resources could not fully utilized. This is also where it is intended to solve the problems of the present invention.

Figure 3:
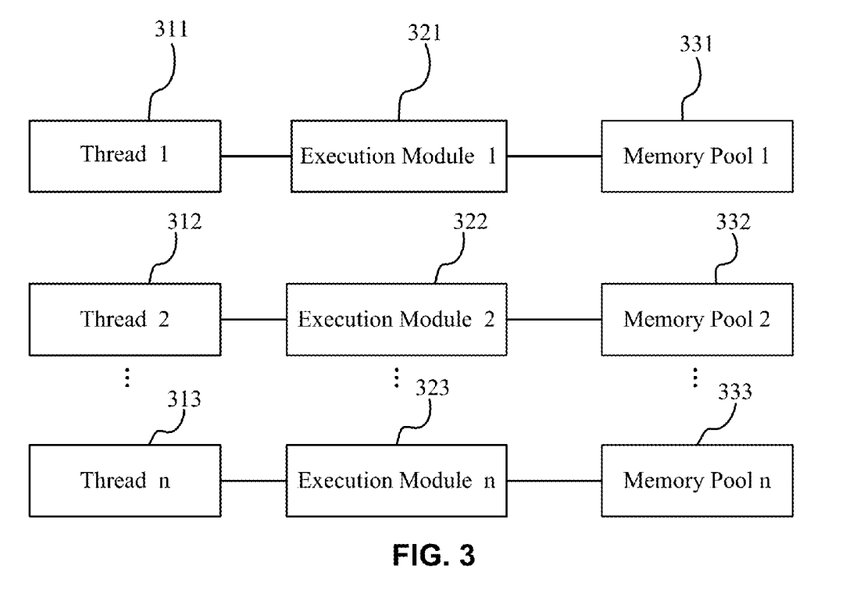
FIG. 3 is a schematic diagram of the memory access when multiple threads create their execution modules respectively.

FIG. 3 shows a memory access schematic diagram when the invention respectively creates the respective execution module for each thread in order to solve the above problem. Taking example for n threads (n is a natural number), in the default case (see FIG. 2), the system has only one original execution module 1 (321), but in the present invention, based on the number of processes, n−1 mirror execution modules are created additionally, i.e. execution module 2 (322) to execution module n (323), so that the total number of the execution modules is equal to the total number of the threads. Wherein, the mirror execution modules can be obtained by copying the original execution module 1, and the function of them is the same as that of the original execution module. At this point, in terms of the operating system, since it will assign a separate memory pool for each execution module by default, each execution module respectively accesses respective different memory pool without disturbing each other. For example as shown in FIG. 3, the execution module 1 (321) accesses the memory pool 1 (331), the execution module 2 (322) accesses the memory pool 2 (332), . . . , the execution module n (323) accesses the memory pool 3 (333). So on the premise that does not change the operating system and the memory management codes, it is achieved that each thread has a separate memory pool. In this way, when the memory operations are needed, each thread does not need to compete for accessing the same memory pool, and it is also unnecessary to wait.

In short, the invention achieves that each thread uses a separate memory pool by the method of copying the execution module. The shared resources to access are made become the exclusive resources, exchanging space for time and avoiding the waiting caused by the memory access conflicts between the threads.

This embodiment is the most typical example of exchanging space for time. This solution can simply transplant single-threaded codes to a multi-threaded environment in the case that don't change or rarely change the module codes and especially don't change memory management at all, and can be said to be a universal method to solve the problem of parallel computing efficiency.

It should be emphasized that in terms of n threads, the number of the mirror execution modules created is not necessarily n−1, which can be any number from 1 to n−1. Since it is clear from the above analysis that the mirror execution modules aim to ease the queuing phenomenon of memory access. This is like the case of queuing at the service window, when the n customers can only obtain service through one window, the efficiency is low, and the mathematical expectation of the waiting time is long; but when an additional window is added (k=1), the entire waiting time of queuing can be significantly reduced; creating n−1 mirror execution modules can reduce the expected queuing time to 0. It's clear that the embodiment shown in FIG. 3 is a preferred embodiment which aims to reduce the waiting time of memory access and not as the limitation to the embodiment of the invention.

Below in combination with the specific flow of FIG. 4, the method of the present invention will be further described. On the whole, the creation of the mirror execution modules of the invention can be divided into two classes including the dynamic mode and the static mode. Wherein, the static mode means the corresponding topology mapping policy between the threads and each execution module is constant during the life cycle of the threads; and in the dynamic mode, the number of the mirror execution modules and the mapping policy between the threads and each execution module are variable.

Figure 4:
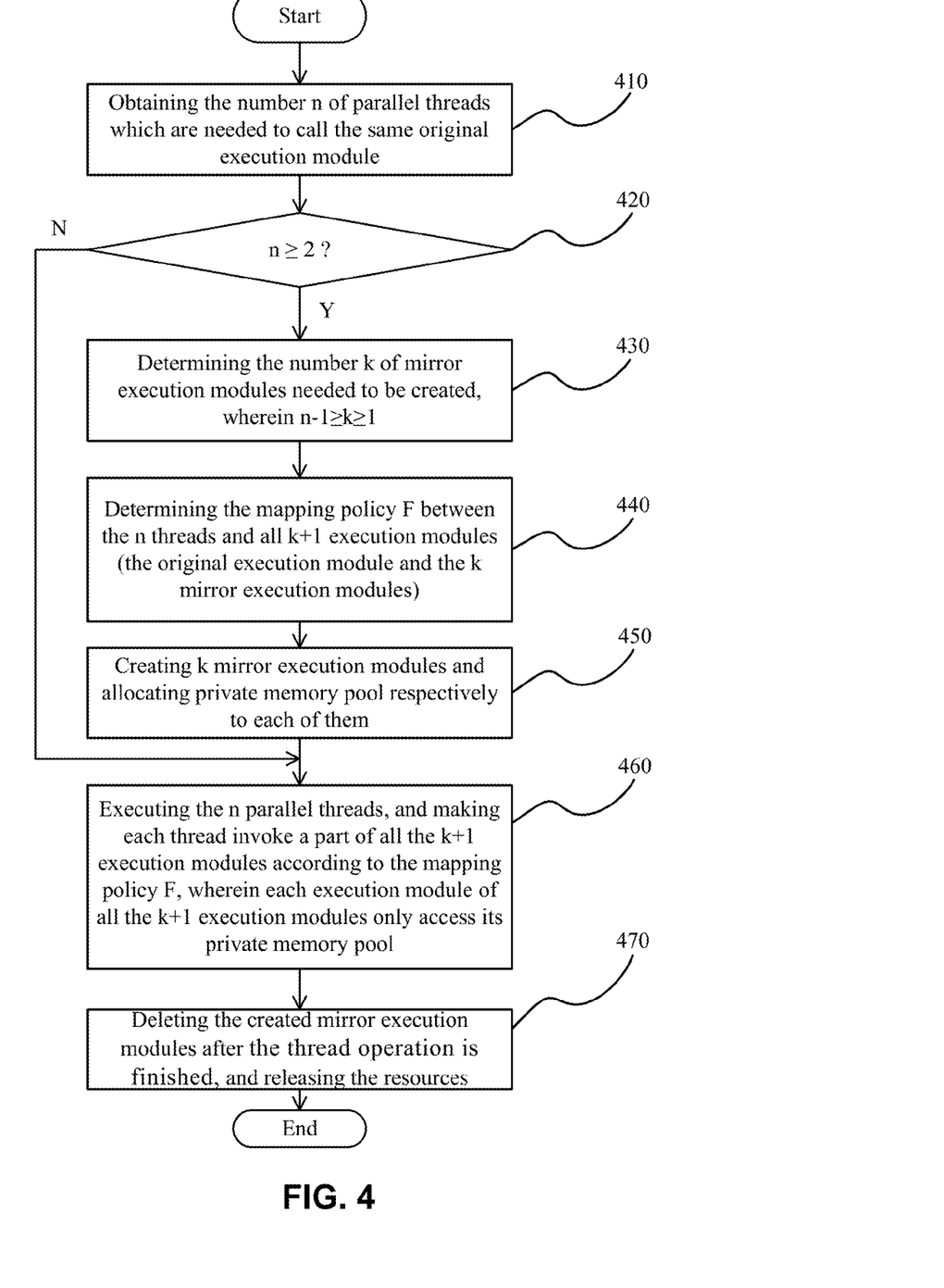
FIG. 4 is a schematic flowchart of a preferred embodiment of the memory access method of the present invention.

FIG. 4 is a schematic flowchart of a preferred embodiment of the memory access method of the present invention. Wherein, the process from the beginning to the end can be a whole story representing an application; and can also be a set of implementation processes which are needed to invoke the life cycle of threads of the same original execution module and so on. This can be determined according to the applicable field of the invention, be chosen by the skilled in the art by themselves according to different applications, and does not constitute the limitation of the invention. For the Convenience of depiction, any point in time from the beginning to the end of the process is represented by t ($t\in[0,T]$) hereinafter, wherein t=0 for the beginning, t=T for the end. Collectively, the execution module includes the original execution module and the mirror execution modules. Wherein, the mirror execution modules and the original execution module perform the same function, but are assigned to use different system resources (such as CPU and memory space).

First, at step 410, obtain the number n of parallel threads which are needed to invoke the same original execution module, wherein n is a natural number. Then, in step 420, make a judgment on n, when n=1, there is only one thread, this thread uniquely corresponds to the execution module, the waiting to access memory caused by the queuing doesn't occur, and go to step 460 to execute the thread directly. When n≥2, this means that waiting may occur, and mirror execution modules are needed to be created to improve the memory access. Generally speaking, the setting of the number n of threads is associated with the number of CPU core of the computing devices.

Next, execute step 430 to determine the number k of mirror execution modules needed to be created, wherein k is a natural number, and preferably, the n−1≥k≥1. Wherein, see FIG. 3 the case that n−1 mirror execution modules are created, that is, the maximum space is exchanged for maximum time efficiency. The selection between other values is the result of the compromise between space and time. The skilled in the art can make a selection according to the actual application environment under the teachings of the present invention. For example, when the number of parallel threads is too large, but the total memory space is limited, if too many mirror execution modules are created, the operation of other programs will be affected or the overall system performance will be significantly reduced, and even there is not enough memory space to create so many mirror execution modules, there is need to reduce the number of the mirror execution modules. Another example, the number of the mirror execution modules can be determined according to the probability that the threads simultaneously invoke the same execution module, when the probability is high, more mirror execution modules are created; and the number of the execution modules is determined according to the statistical value (such as maximum, median, or mathematical expectation) of the number of threads which invoke the same execution module at the same time.

Selecting a static mode is a simple embodiment. Wherein, k is a constant value, and k(t) is kept constant when t∈[0,T]. The advantage of the static mode is that the program is simple to be executed and the memory space which is occupied is constant, which will help stabilize execution. The disadvantage is that when the frequency fluctuations of invocations on the execution modules are large in the course of process operation, if a large value k is chosen, this may result in the waste of memory space, and if a smaller value k is chosen, this may result in that the waiting to access memory occurs during a period of frequent invocation.

The dynamic mode is more flexible. k(t) is variable when t∈[0,T], according to the frequency of invocation on the execution modules in the course of process operation, k(t) can be set to a piecewise function. During a period that multiple threads invoke the execution modules frequently, a larger value k(t) is chosen, but during a period of that the execution modules are relatively less invoked, a smaller value k(t) is chosen. Flexibly changing in the course of the process operation and thus it avoids wasting memory space to release resources in time. But the disadvantage of the dynamic mode is that the access control is slightly too complicated, there is a problem of parameter passing, additional codes is needed, and it is not conducive to the direct transplant of a single-threaded program to multi-threaded program.

In step 440, the mapping policy F between the n threads and the execution modules including the original execution module as well as the k mirror execution modules is determined.

The mapping policy F mainly reflects such a one-way relationship that which thread invokes which execution module. Similarly, the mapping policy F is also divided into static policy and dynamic policy. Wherein, for the static policy, one thread only points to one execution module which is invoked by the thread, and one execution module can be invoked by one or more threads. And this invoking relationship is kept constant during a period of t∈[0,T]. Static policy performs simple without too much extra codes.

It is more preferred that, for those threads which invoke execution modules frequently, they can be configured to exclusive access one execution module, and for the threads which relatively less frequently invoke execution modules, they are configured to share to access one execution module.

For dynamic policy, the thread can not be fixedly pointed to a certain execution module. For example, a segmentation setting can be made to the mapping policy F in coordination with the dynamic mode of mirror execution modules, the time t(t∈[0,T]) is divided into several time periods, and the static policy is used during each time period. Alternatively, a variety of different modes of a similar multi-window-queuing mechanism and so on can also be taken.

According to an embodiment of the present invention, two states including "free" and "busy" which are defined as for each execution module correspond to different invoking states. All of the free execution modules are queued, the first thread which needs to invoke execution modules invokes the first one from the free execution module queues; if there is a new thread needing to invoke execution modules; if there are no free execution modules, the new thread is made to invoke the next one from the free execution modules. The execution modules are labeled as busy during invoking the execution modules of the thread; after the execution is finished, the thread releases the execution modules, and the execution modules are labeled as free. The benefits of such a queuing mechanism can be that maximize the full use of resources, especially for the case that k<n−1, not only overall saving the memory resources but also effectively avoiding the case that the waiting to access memory occurs with resources being free. Particularly suitable for more threads and the case that the randomness of invocation of thread on the execution modules is strong, a substantial increase in efficiency can be achieved with the method of the invention which uses less memory mirror modules.

Obviously, the static mode and the dynamic mode of various mirror modules and the static policy and the dynamic policy of mapping policy F can be combined with each other to constitute various flexible memory access control policy. Its specific implementation steps should be implemented by the skilled in the art by themselves under the above teachings of the present invention. It should be noted that, no matter what combinations and conversions, without departing from the spirit and essence of the present invention, will fall into the scope defined by the appended claims.

Next proceeding to step 450, create k mirror execution modules and assign a respective separate memory pool to the mirror execution modules. In this step, after the mirror execution modules are created, memory assignation is actually completed by the operating system control and does not need the intervention of the application.

After the mirror modules are completed, then proceeding to step 460, execute the n parallel threads and make them invoke the execution modules according to the mapping policy F. In the course of operation, each execution module accesses and only accesses its private memory pool.

The last step is 470, delete all the created mirror execution modules after the thread operation is finished, and release the resources which are assigned to the mirror execution modules.

Figure 5:
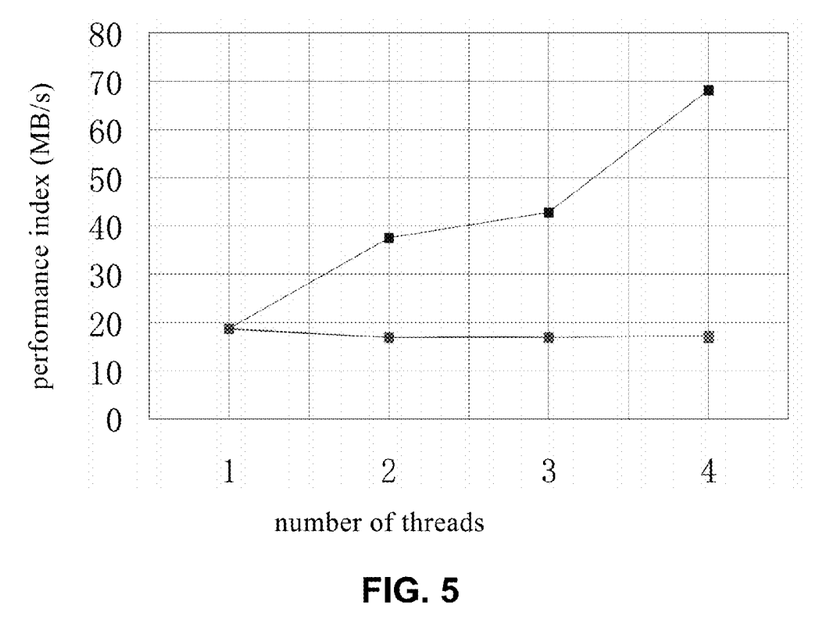
FIG. 5 is a first comparative diagram of the thread performance when utilizing the method of the invention and the other measures.
Figure 6:
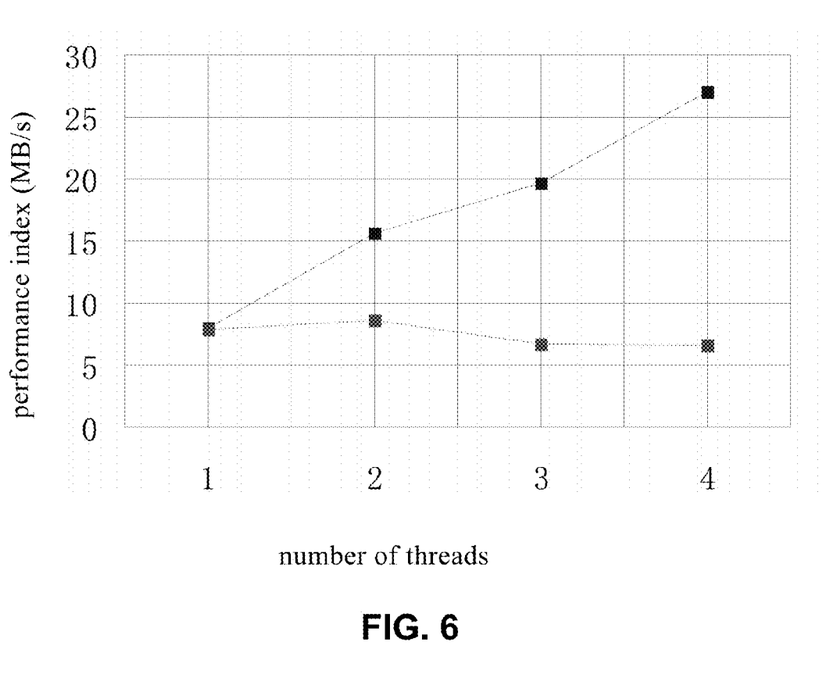
FIG. 6 is a second comparative diagram of the thread performance when utilizing the method of the invention and the other measures.
Figure 7:
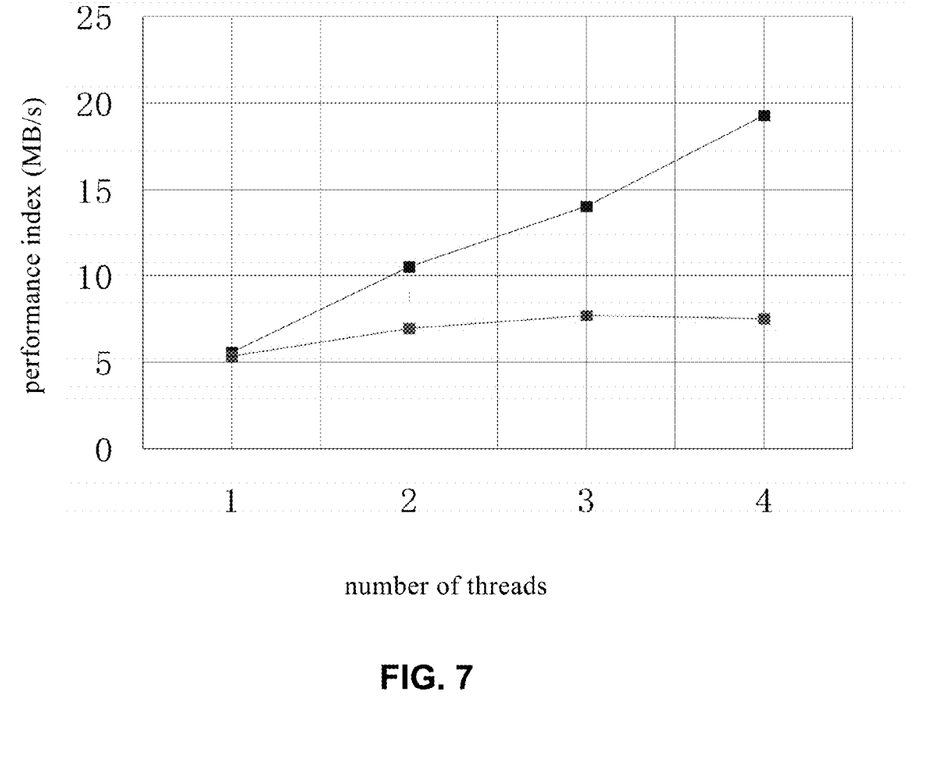
FIG. 7 is a third comparative diagram of the thread performance when utilizing the method of the invention and the other measures.

FIG. 5 to FIG. 7 show the comparison between the performance after performing memory access control according to the method of the invention and that of when don't employ the invention, which is embodied by the following examples. It should be noted that the following examples are presented to illustrate the effect of the invention and not to restrict the implementation conditions of the present invention.

Taking example for Windows operating system, perform test by simple text extraction on pdf file. Testing environment: software Environment: Windows XP professional SP2 32 bit, hardware environment: Core 2 Quad Q6600 2.4 GHz (4 core) 3.25 GB memory.

Testing tools: Using the ifilttst.exe testing tool program ifilttst.exe of the platform sdk released by Microsoft, this program simply makes complete extraction on a file once and performs no more check work. This testing tool is one of that are commonly known in the art, and with regard to its details, refer to the description of http://msdn.microsoft-.com/en-us/library/ms692580 (28VS.85). aspx.

The ifilttst.exe may create a different number of threads correspondingly, and during operation, each thread will invoke an execution module example.dll. The abscissa 1, 2, 3, 4 in FIG. 5 to FIG. 7 represent the number of threads, correspondingly using a plurality of different processor core run operation. Ordinate represents the performance indexes using the file processing speeds. The different curves represent the cases of implementation when the method of the invention is used and not used. Wherein, the embodiment of the method of the invention is to: for the different number n of threads, create k (k=n−1) mirror execution modules respectively, and employ the static mapping policy of the static mode. That is, each thread points to an execution module and remains constant in the course of the implementation.

In the embodiment of FIG. 5, the sample 1 is 219 files and the total size is 1.54 GB, characteristics: the files are larger and the number of the files is less.

In the embodiment of FIG. 6, the sample 3 is 351 files, the total size is 1.16 GB, and the number of the files and the sizes of each file are more evenly.

Sample 3 in FIG. 7 is 1274 files, the total size is 925 MB, and the number and the sizes of the files are smaller.

In FIG. 5 to FIG. 7, the curve L1 is the implementation case when ifilttst.exe use the method of the invention; curve L2 is the operation case when ifilttst.exe don't use the accelerating method of the invention.

It can be seen from FIG. 5 to FIG. 7 that although the single-threaded performance of the testing tool program ifilttst.exe does not improve, multi-threaded performance can really be released, each core is utilized, and the performance grows from 1-4 threads. Curve L2 without the accelerating method of the invention, although the performance improves with the increase in the number of CPU core, can not play CPU to the best performance, and the performance is always limited.

Figure 8:
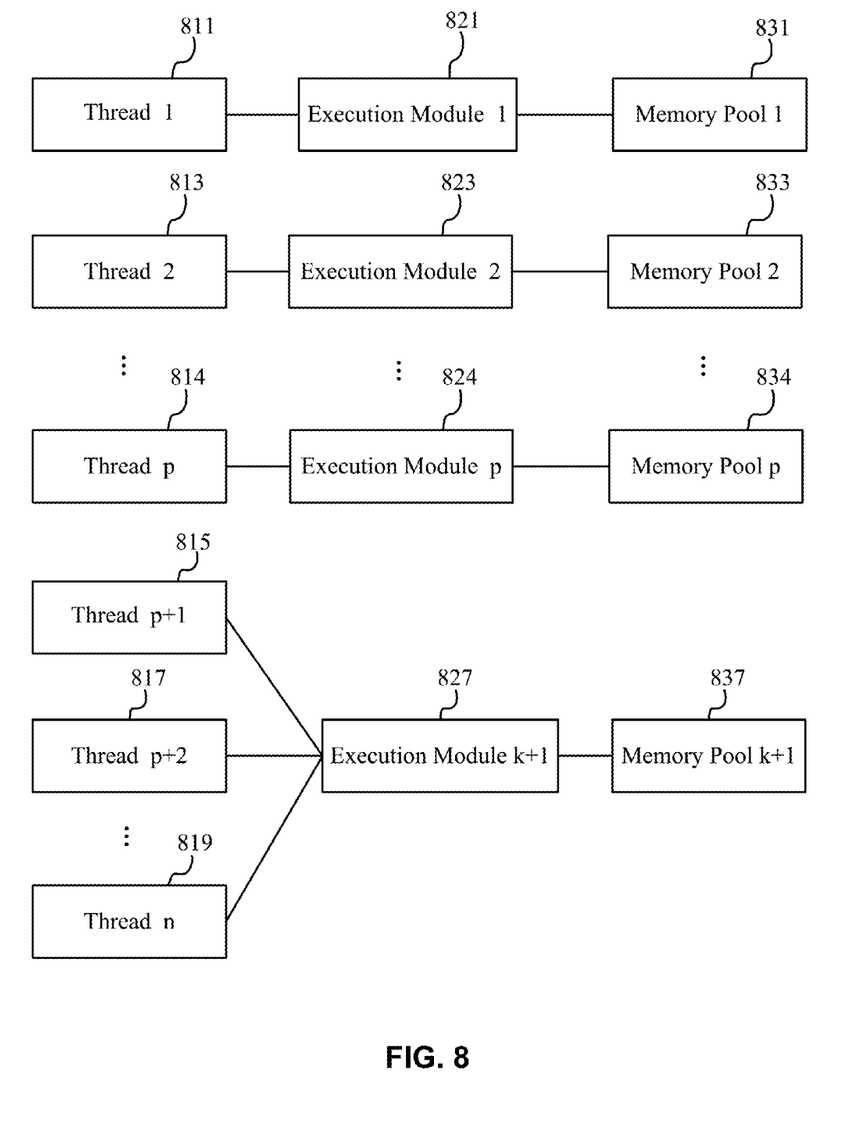
FIG. 8 is a schematic diagram of memory access for some threads exclusively invoking one execution module.

FIG. 8 is a schematic diagram of memory access for some threads exclusively invoking one execution module. In this embodiment, each thread of the n parallel threads that frequently invokes a part of the k+1 execution modules is configured to exclusively access one execution module of the k+1 execution modules. This is illustrated in FIG. 8 with threads 811,813,814 invoking execution modules 821,823, 824 respectively. A plurality of remaining threads of the n parallel threads that relatively less frequently invoke the part of the k+1 execution modules are configured to share access to one execution module of the k+1 execution modules. This is illustrated in FIG. 8 with threads 815,817,819 invoking and sharing access to execution module 827.

Figure 9:
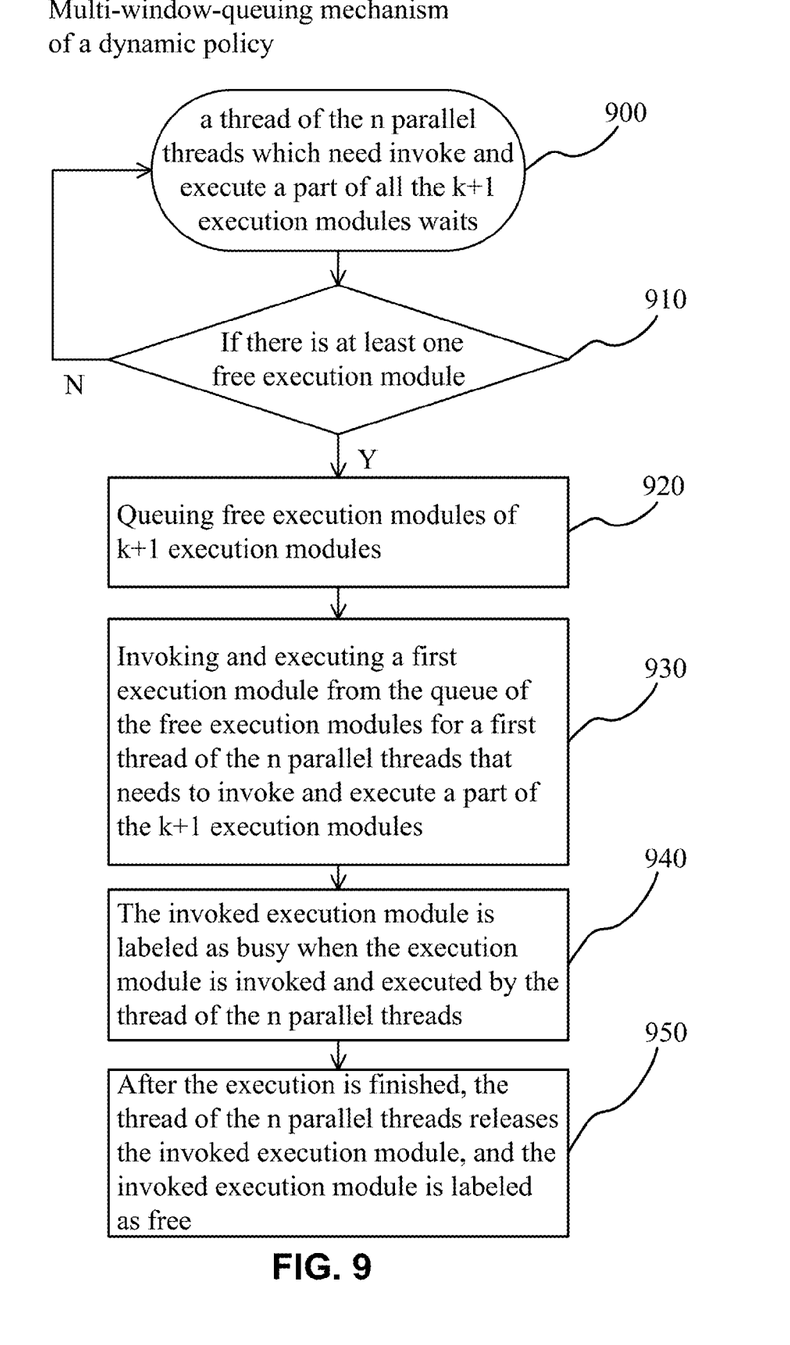
FIG. 9 is a schematic flowchart of a preferred embodiment of the mapping policy of a multi-window-queuing mechanism dynamic policy.

FIG. 9 is a schematic flowchart of a preferred embodiment of the mapping policy of a multi-window-queuing mechanism dynamic policy. Control begins at 900, wherein a thread of the n parallel threads which need to invoke and execute a part of the k+1 execution modules waits. Control proceeds to 910, where control determines if there is at least one free execution module. If there are no free execution modules available for the thread, control returns to 900 and the thread of the n parallel threads which need to invoke and execute a part of the k+1 execution modules waits; otherwise, control proceeds to 920.

Control at 920 queues all of the free k+1 execution modules. Control then proceeds to 930, in which a first execution module selected from the queue of the free execution modules for a first thread of the n parallel threads is invoked and executed for a first thread of the n parallel threads that needs to invoke and execute a part of the k+1 execution module.

Control at 930 proceeds to 940, where in response to the first execution module being invoked and executed by the first thread, the invoked first execution module is labeled as busy.

Control at 940 proceeds to 950, where in response to the execution of the first thread being finished, the invoked execution module is released from the first thread and labelled as free.

The above description of the invention is intended to be illustrative, but not restrictive, it should be understood by the skilled in the art that many modifications, changes, or equivalents can be made to the invention within its spirit and scope, but they all fall within the scope of protection of the invention.

The invention claimed is:

1. A memory access method for parallel computing for n parallel threads that invoke one original execution module, the method comprising:
   determining a number k of k mirror execution modules needed to be created based on the number n of the n parallel threads, wherein n≥2 and wherein 1≤k≥n−1;
   determining a mapping policy F between the n parallel threads and k+1 execution modules, wherein the k+1 execution modules include the original execution module and the k mirror execution modules and wherein the original execution module is an executable program or a dynamic link library composed of instructions that are stored on a non-transitory computer-readable medium and executable by a processor;
   creating the k mirror execution modules by copying the original execution module, wherein the original execution module has a plurality of functions, and wherein a plurality of functions of each of the k mirror execution modules is the same as the plurality of functions of the original execution module;
   allocating a private memory pool from the non-transitory computer-readable medium to each of the k mirror execution modules respectively;
   executing the n parallel threads, and making each thread invoke one of the k+1 execution modules according to the mapping policy F, wherein each execution module of the k+1 execution modules only accesses its respective private memory pool; and
   after the execution of the n parallel threads are finished, deleting the k mirror execution modules and releasing resources.

2. The memory access method for parallel computing according to claim 1, wherein the number k of the k mirror execution modules varies with time.

3. The memory access method for parallel computing according to claim 1, wherein the number k of the k mirror execution modules is constant while executing a part of the n parallel threads.

4. The memory access method for parallel computing according to claim 3, wherein the number k of k mirror execution modules is determined according to a statistical value of the number of a part of the n parallel threads invoking a same execution module at a same time.

5. The memory access method for parallel computing according to claim 3, wherein the number k of the k mirror execution modules is 1.

6. The memory access method for parallel computing according to claim 3, wherein the number k of the k mirror execution modules is n−1.

7. The memory access method for parallel computing according to claim 6, wherein according to the mapping policy F:
   each thread invokes a different one of the k+1 execution modules, and
   the n parallel threads and the k+1 execution modules are in one-to-one correspondence with each other.

8. The memory access method for parallel computing according to claim 1, wherein the mapping policy F is a static policy, and wherein according to the mapping policy F:
   each thread of the n parallel threads only points to and invokes exactly one of the k+1 execution modules, and
   each of the k+1 execution modules is invoked by one or more of the n parallel threads.

9. The memory access method for parallel computing according to claim 8, wherein according to the mapping policy F:
   each thread of the n parallel threads that frequently invokes a part of the k+1 execution modules is configured to exclusively access one execution module of the k+1 execution modules; and
   remaining threads of the n parallel threads that relatively less frequently invoke the part of the k+1 execution modules are configured to share access to one execution module of the k+1 execution modules.

10. The memory access method for parallel computing according to claim 1, wherein:
    the mapping policy F is a multi-window-queuing mechanism of a dynamic policy;
    in the dynamic policy, each one of the k+1 execution modules is defined as one of two states including a free state and a busy state;
    the method includes queuing all free execution modules of the k+1 execution modules in a queue;
    the method includes invoking and executing a first execution module selected from the queue of the free execution modules for a first thread of the n parallel threads that needs to invoke and execute a part of the k+1 execution modules;
    the method includes causing the first thread to wait in response to there not being any free execution modules;
    the method includes, in response to the first execution module being invoked and executed by the first thread, labelling the first execution module as busy; and
    the method includes, in response to the execution of the first thread being finished, releasing the invoked execution module from the first thread and labelling the invoked execution module as free.

11. An apparatus comprising:
    a non-transitory computer-readable medium storing instructions and storing one original execution module;
    a processor configured to execute the instructions from the non-transitory computer-readable medium, the instructions comprising:
    determining a number k of k mirror execution modules needed to be created based on a number n of n parallel threads, wherein n≥2 and wherein 1≤k≥n−1;
    creating the k mirror execution modules by copying the original execution module, wherein the original execution module has a plurality of functions, and wherein a plurality of functions of each of the k mirror execution modules is the same as the plurality of functions of the original execution module;
    determining a mapping policy F between the n parallel threads and k+1 execution modules, wherein the k+1 execution modules include the original execution module and the k mirror execution modules;
    allocating a private memory pool from the non-transitory computer-readable medium to each of the k mirror execution modules respectively;
    executing the n parallel threads, and making each thread invoke a part of the k+1 execution modules according to the mapping policy F, wherein each execution module of the k+1 execution modules only accesses its respective private memory pool; and
    after the execution of the n parallel threads are finished, deleting the k mirror execution modules and releasing resources.

12. A memory access method for parallel computing for n parallel threads that invoke one original execution module, the method comprising:
    determining a mapping policy F that is one-to-one between n parallel threads and n execution modules, wherein n≥2, wherein the n execution modules include the original execution module and n−1 mirror execution modules, and wherein the original execution module is an executable program or a dynamic link library composed of instructions that are stored on a non-transitory computer-readable medium and executable by a processor;
    creating the n−1 mirror execution modules by copying the original execution module, wherein the original execution module has a plurality of functions, and wherein a plurality of functions of each of the n−1 mirror execution modules is the same as the plurality of functions of the original execution module;
    allocating a private memory pool from the non-transitory computer-readable medium to each of the n−1 mirror execution modules respectively;
    executing the n parallel threads, and making each thread invoke a corresponding one of the n execution modules according to the mapping policy F, wherein each execution module of the n execution modules only accesses its respective private memory pool; and
    after the execution of the n parallel threads are finished, deleting the n−1 mirror execution modules and releasing resources.

13. The memory access method for parallel computing according to claim 1, further comprising:
    determining the number k of the k mirror execution modules dynamically within a time period t ∈ [0,T];
    segmenting the time period t into a plurality of time periods; and
    within each time period of the plurality of time periods, (i) determining a respective static mapping policy F from the n parallel threads to the k+1 execution modules and (ii) executing the n parallel threads by invoking the k+1 execution modules according to the mapping policy F.

* * * * *